United States Patent [19]

Meacham

[11] 3,810,024

[45] May 7, 1974

[54] METHOD AND CIRCUIT FOR MONITORING AND DETECTING SWEEP SIGNAL FAILURE

[75] Inventor: James H. Meacham, Laurel, Md.

[73] Assignee: Westinghouse Electric Corporation, Pittsburgh, Pa.

[22] Filed: Nov. 20, 1972

[21] Appl. No.: 308,090

[52] U.S. Cl. .................... 328/8, 307/228, 307/232, 315/20, 317/36 TD

[51] Int. Cl. .................... H02h 7/00

[58] Field of Search .............. 328/8, 9, 10; 307/228, 307/232; 315/20

[56] References Cited

UNITED STATES PATENTS

| | | | |
|---|---|---|---|
| 3,439,282 | 4/1969 | Moriyasa | 307/228 X |
| 3,588,608 | 6/1971 | Halinski et al. | 328/9 X |
| 3,302,033 | 1/1967 | Goodrich | 307/228 X |
| 2,882,445 | 4/1959 | Sprengeler et al. | 328/8 X |
| 2,868,975 | 1/1959 | Harris et al. | 307/228 X |
| 3,714,463 | 1/1973 | Laune | 307/232 |
| 3,715,499 | 2/1973 | Steckler | 307/232 |
| 3,458,822 | 7/1969 | Hahn | 307/232 X |
| 3,308,333 | 3/1967 | Lent | 315/20 |
| 3,374,391 | 3/1968 | Friess | 315/20 |
| 3,501,670 | 3/1970 | Johnston et al. | 315/20 |

*Primary Examiner*—Rudolph V. Rolinec
*Assistant Examiner*—William D. Larkins
*Attorney, Agent, or Firm*—C. L. O'Rourke

[57] ABSTRACT

A method and sweep signal monitoring circuit for protecting scanned electron tubes, particularly high sensitivity imaging devices such as television camera tubes, from damage upon loss of a sweep voltage. A monitoring circuit monitors the sweep voltage and generates, through the use of complementary gating signals, a digital signal having a first signal level for a normal sweep voltage and a second signal level for an abnormal sweep voltage. The second signal level of the digital signal not only indicates loss of the sweep voltage but also indicates undesirable changes in the zero crossing point of the sweep voltage. The signal level of the digital signal is monitored and the detection of the second signal level may result in the inhibiting of the scanning of the tube or in any other suitable protective measures.

18 Claims, 5 Drawing Figures

METHOD AND CIRCUIT FOR MONITORING AND DETECTING SWEEP SIGNAL FAILURE

BACKGROUND OF THE INVENTION

1. Field of the Invention

This invention relates to electro-optical scanning systems and, more particularly, to a method and sweep signal monitoring circuit for protecting scanned electron tubes, particularly high sensitivity imaging devices such as television camera tubes, from damage upon loss of a sweep signal.

2. State of the Prior Art

Imaging devices such as vidicons or other television camera tubes typically include a target which is electronically scanned with electrons from a cathode to provide a raster or frame of video information. To insure a relatively constant video signal amplitude as light conditions change, a circuit may be provided to automatically increase the cathode voltage as the illumination of the scene decreases.

As the target is electronically scanned, an abnormal vertical sweep condition such as the total loss of the vertical sweep may damage the target if proper measures are not taken within a very short time period, particularly in high sensitivity imaging devices utilized under low light level conditions. For example, if the vertical sweep voltage is lost, the target is continuously scanned along the same horizontal line. Simultaneously, the loss of vertical sweep results in a loss of video information and an automatic increase in cathode potential. The continuous scanning along one horizontal line combined with the increase in cathode voltage may rapidly result in damage to the target due to excessive electron impact on the target.

Existing vertical sweep failure protection circuits typically employ clamping, integration and threshold techniques to detect and react to loss of vertical sweep. These techniques may, however, be limited in reaction time to between one and three times the vertical sweep repetition rate, e.g., approximately 50 milliseconds, and may thus result in tube damage.

OBJECTS AND SUMMARY OF THE INVENTION

It is accordingly an object of the present invention to provide a novel method and circuit for monitoring and rapidly detecting abnormal conditions of electron tube sweep voltages.

It is another object of the present invention to provide a novel method and circuit for detecting an abnormal sweep voltage condition during the first sweep voltage cycle in which the condition occurs.

It is yet another object of the present invention to provide a novel method and circuit for monitoring a sweep voltage wherein the condition of the sweep voltage is sampled at a rate exceeding the repetition rate of the sweep voltage.

It is a further object of the present invention to provide a novel method and digital circuit for monitoring a sweep voltage and rapidly indicating an abnormal condition thereof so as to protect an electron tube scanned by the monitored sweep voltage from damage.

These and other objects and advantages are accomplished in accordance with the present invention by generating a digital signal having one signal level for a normal condition of an electron tube sweep voltage and another signal level for an abnormal condition of the sweep voltage and then periodically sampling the digital signal at a rate equal to or exceeding the repetition rate of the sweep voltage. The digital signal may be generated by gating either the sweep voltage and the inverted sweep voltage or signals indicative of the sweep voltage zero crossover point with gating signals substantially corresponding in duration and coinciding in time to respective half cycles of a normal sweep voltage. An output signal generated responsively to the digital signal and indicating the detection of an abnormal sweep voltage may be utilized to prevent the electron tube from being damaged.

DETAILED DESCRIPTION

Figure 1:
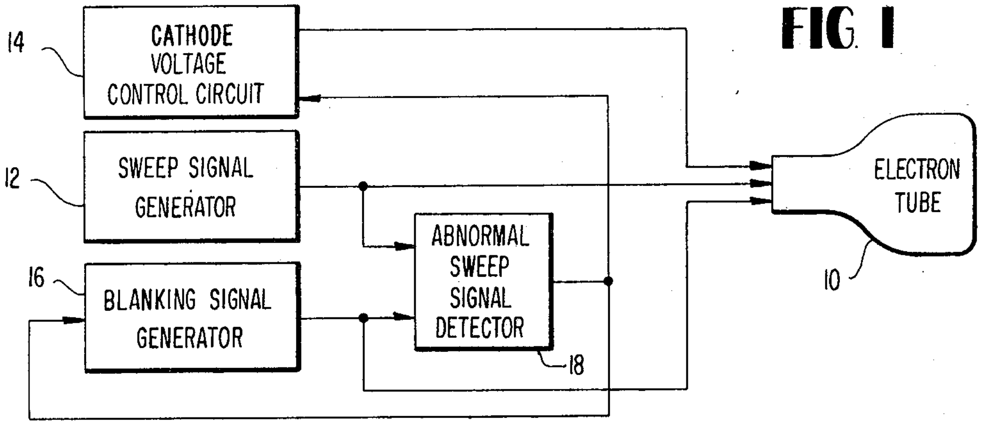
FIG. 1 is a functional block diagram of an electron tube scanning system employing the circuit of the present invention.

A typical scanned electron tube system in which the circuit of the present invention may have particular utility is illustrated functionally in FIG. 1.

Referring to FIG. 1, an electronically scanned tube such as a vidicon or image orthocon camera tube may include an electron gun (not shown) which emits electrons for scanning a target at the face of the tube 10. The scanning of the target by the electrons emitted from the cathode of the electron gun is typically controlled by sweep or scan signals, e.g., vertical and horizontal sweep signals, generated by a suitable conventional sweep signal generator 12 and applied to deflection plates or coils (not shown) in or encircling the neck of the tube 10.

The emission of electrons from the cathode of the electron tube 10 may be controlled automatically or manually through the application of a variable amplitude voltage thereto from a suitable cathode voltage control circuit 14. In this manner, the sensitivity of the electron tube 10 may be varied for varying light conditions. Moreover, the electron tube 10 may be inhibited or blanked in a conventional manner, e.g., in response to blanking signals from a blanking signal generator 16, during the return portion of the sweep signals to prevent an undesirable tracking of the electron beam from the cathode during these periods.

If one of the sweep voltages should be lost or otherwise cause an abnormal scanning pattern of the electron beam, the electron tube 10 may be damaged by excessive electrons striking one area of the tube. In accordance with the present invention, the sweep signals from the sweep signal generator 12 are monitored by an abnormal sweep signal detector 18 in conjunction with the corresponding blanking signals from the blanking signal generator 16. When an abnormal sweep condition is detected by the detector 18, the detector 18 provides an output signal signifying an abnormal sweep voltage condition and this output signal may in turn be utilized to inhibit the cathode voltage and/or to otherwise effect tube protection such as by generating a suitable tube blanking signal.

Figure 2:
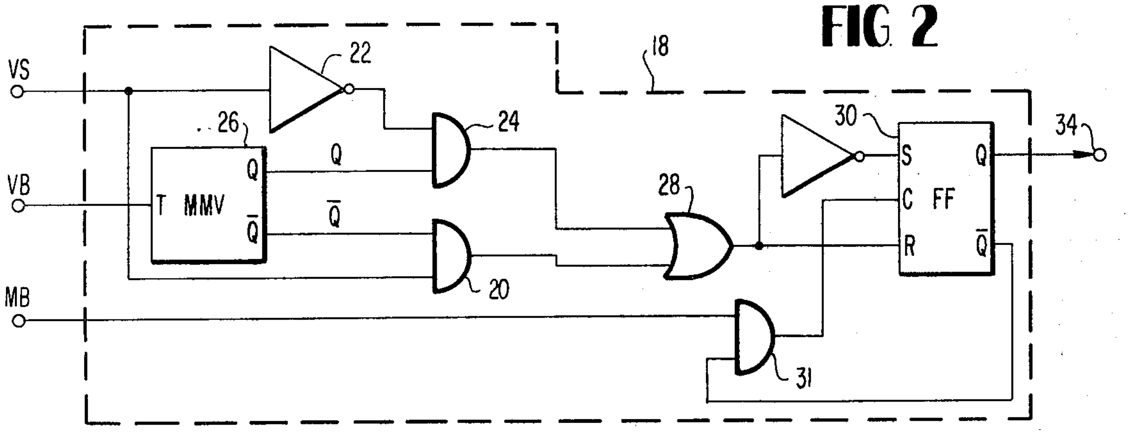
FIG. 2 is a more detailed block diagram of one embodiment of the detector circuit of FIG. 1.

One embodiment of the abnormal sweep signal detector or monitor 18 of FIG. 1 is illustrated in greater detail in FIG. 2. Typical waveforms at various points within the detector 18 are graphically illustrated in FIG. 3.

Figure 3:
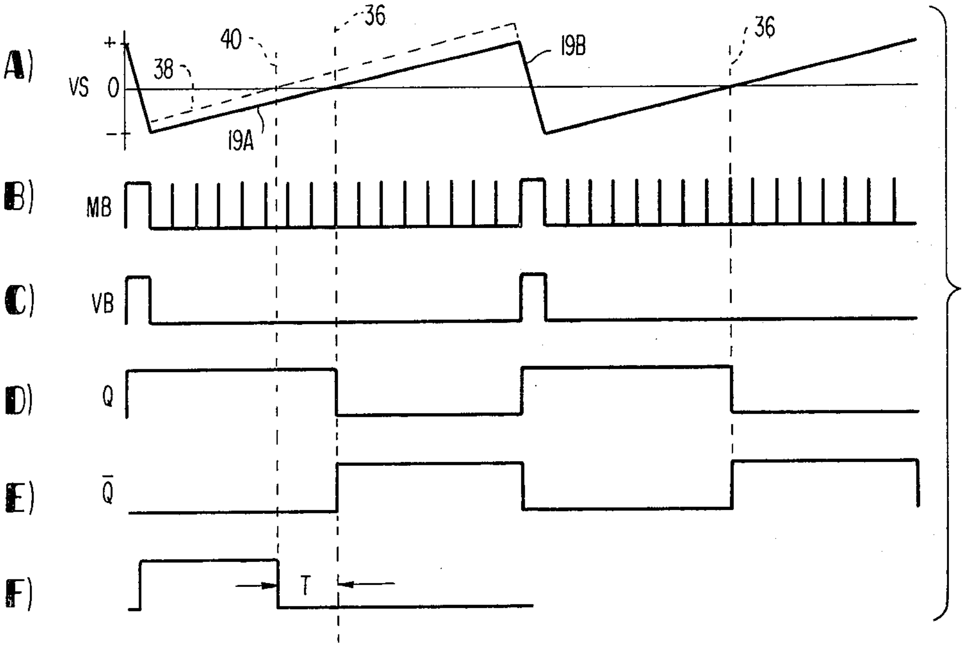
FIG. 3 is a graphical illustration of typical waveforms of the circuit of FIG. 2.

Referring now to FIGS. 2 and 3, a sweep voltage such as the vertical sweep signal VS (waveform A) has an operational or active cycle 19A during which the sweep voltage linearly varies from maximum negative to maximum positive and has a return portion 19B. This signal may be applied to one input terminal of a two input terminal AND gate 20 and through an inverter 22 to one input terminal of a two input terminal AND gate 24. The blanking signal associated with and synchronized with the sweep signal being monitored, i.e., the vertical blanking signal VB (waveform C) when the vertical sweep signal VS is being monitored, may be applied to the trigger input terminal T of a conventional monostable or one-shot multivibrator 26. The output signal Q (waveform D) from the true or Q output terminal of the multivibrator 26 may be applied to the other input terminal of the AND gate 24 and the output signal $\overline{Q}$ (waveform E) from the false or $\overline{Q}$ output terminal of the multivibrator 26 may be applied to the other input terminal of the AND gate 20.

The output signals from the AND gates 20 and 24 may be applied to the respective input terminals of a two input terminal OR gate 28 and the output signal from the OR gate 28 may be applied to the reset steering terminal R of a suitable conventional bistable multivibrator or flip-flop 30 as well as through an inverter 32 to the set steering terminal S of the flip-flop 30. A mixed blanking signal MB (waveform B) or other suitable available signal having a repetition rate exceeding that of the vertical sweep signal VS may be applied to the clock input terminal of the flip-flop 30 through an AND gate 31 normally enabled by the output signal from the false output terminal $\overline{Q}$ of the flip-flop 30. The signal from the true or Q output terminal of the flip-flop 30 may be provided at an output terminal 34 for application to the cathode voltage control circuit 14 of FIG. 1.

In operation, the vertical blanking signal VB applied to the multivibrator 26 triggers the multivibrator 26 at the beginning or immediately prior to the beginning of each active cycle 19A of the vertical sweep signal. The time constant of the multivibrator 26 is selected so that the true output terminal Q assumes a high signal level for a period of time approximately equal to the time period of one-half of the active cycle 19A of the vertical sweep signal VS so that this gating signal (waveform D) is equal in duration to at least one-half of the total period of the active sweep cycle. The complement of the signal at the true output terminal Q of the multivibrator 26 is available at the false output terminal $\overline{Q}$ thereof and thus assumes a high signal level during approximately the entire latter half of the active cycle 19A of the vertical sweep signal VS so that this gating signal (waveform E) is also equal in duration to at least one-half the total duration of the active sweep cycle. In this manner, complementary gating signals Q and $\overline{Q}$ each substantially corresponding in duration and coinciding in time to respective half cycles of the sweep voltage VS are provided.

The complementary gating signals Q and $\overline{Q}$ from the multivibrator 26 are applied to the AND gates 24 and 20 and enable the AND gates 24 and 20 during the respective first and second half cycles of the vertical sweep signal VS. The inverted vertical sweep signal applied to the AND gate 24 is at a high or positive signal level during the first half cycle of the vertical sweep signal and thus the output signal from the enabled AND gate 24 assumes a high signal level during this first half cycle. The noninverted vertical sweep signal applied to the AND gate 20 is at a high or positive signal level during the latter half cycle thereof and thus the output signal from the enabled AND gate 20 assumes a high signal level during the latter half cycle of the vertical sweep signal. Thus, for a normal vertical sweep signal, the output signal from the OR gate 28 assumes a high signal level throughout the entire operational or active cycle 19A of the vertical sweep signal VS, i.e., during the transition of the vertical sweep signal from maximum negative to maximum positive.

The high or binary ONE signal from the OR gate 28 applied to the reset steering terminal R of the flip-flop 30 causes the flip-flop 30 to be initially reset by a pulse of the signal MB and to remain reset as long as the vertical sweep signal is normal throughout its operational range. However, if the vertical sweep signal is lost at any time, the output signal from the OR gate 28 assumes a low signal level applying an enabling signal to the set steering terminal S of the flip-flop 30 so that the flip-flop 30 is set by the first of the mixed blanking signals occurring after loss of vertical sweep.

Moreover, if the vertical sweep voltage VS becomes abnormal resulting in a shift in the point at which the active cycle of the sweep voltage crosses the zero axis, i.e., resulting in a significant shift from the zero crossing point generally indicated at 36 in FIG. 3, one of the AND gates 20 and 24 detects this condition through the comparison of the respective gating signals Q and $\overline{Q}$ with the vertical sweep signal $\overline{VS}$ and the inverse thereof VS. For example, as is illustrated in phantom at 38 in waveform A of FIG. 3, the level of the vertical sweep signal may shift resulting in a shift in the zero crossover point from the point 36 to the point 40.

The resulting output signal from the AND gate 24 thus assumes a high signal level for significantly less than the duration of the first half cycle of the vertical sweep signal as is indicated in waveform F. There is thus a period of time T between the points 36 and 40 during which a low signal level is applied to the reset input terminal of the flip-flop 30 and a high signal level is applied to the set input terminal thereof. During this period T the occurrence of any mixed blanking signals of waveform B clock the flip-flop 30 to its set condition and the output signal at the output terminal 34 assumes a high signal level signifying the detection of an abnormal sweep voltage. The signal provided in this manner may then be utilized in any suitable conventional manner to prevent damage to the electron tube 10 of FIG. 1.

It should be noted that an abnormal or lost sweep voltage is not only detected and indicated during the abnormal cycle but is also detected and indicated early in the abnormal cycle since the flip-flop 30, in conjunction with the mixed blanking signal MB, periodically samples the level of the signal from the OR gate 28 at a rate exceeding the repetition rate of the sweep voltage being monitored and immediately generates the required inhibit signal upon sampling a low signal level from the OR gate 28.

Of course, the signal from the OR gate 28 may be continuously monitored for a fault indication. However, the flip-flop 30 provides a convenient latching circuit which is set upon occurrence of a fault and remains reset until the sweep voltage condition is remedied.

Figure 4:
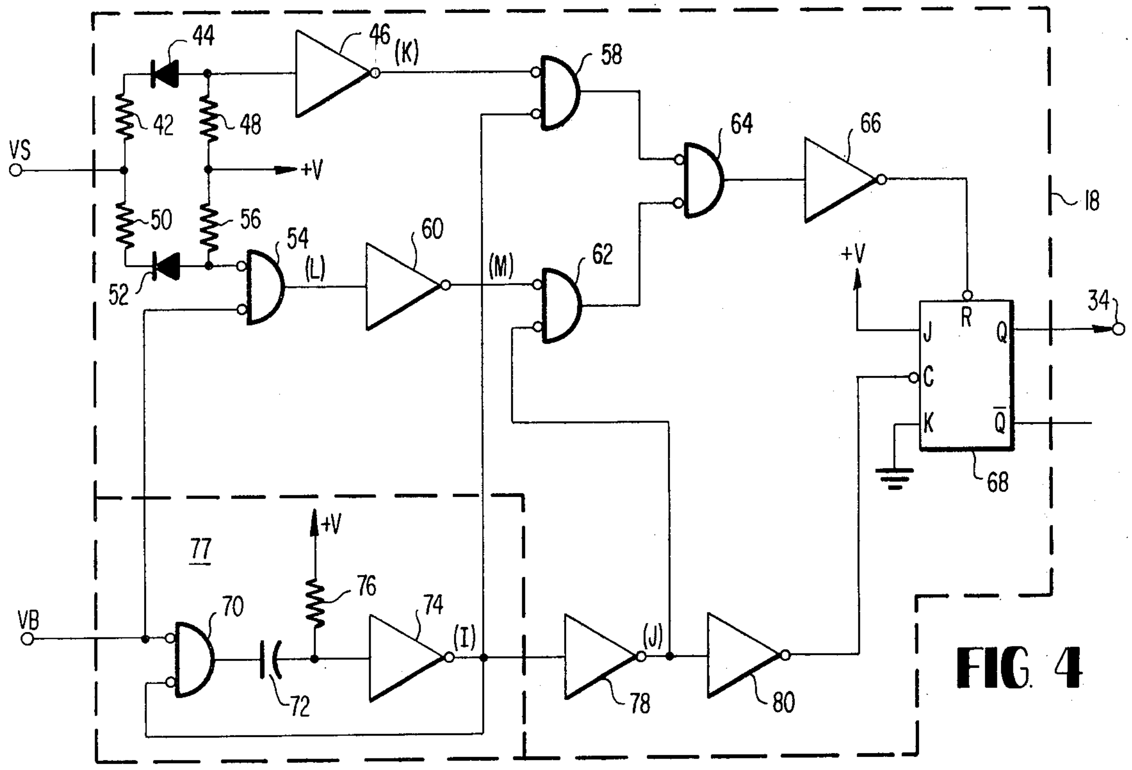
FIG. 4 is a more detailed block diagram of another embodiment of the detector circuit of FIG. 1; and, FIG. 5 is a graphical illustration of typical waveforms of the circuit of FIG. 4.

Another embodiment of the normal sweep signal detector 18 of FIG. 1 is illustrated in the functional block diagram of FIG. 4. Referring now to FIG. 4 and the corresponding waveforms of FIG. 5, the vertical sweep signal VS (waveform G) may be applied through a resistor 42 to the cathode electrode of a diode 44 and the anode electrode of the diode 44 may be connected to the input terminal of an inverter 46. The input terminal of the inverter 46 may also be connected through a resistor 48 to a suitable positive voltage source +V.

The vertical sweep signal VS may also be applied through a resistor 50 to the cathode electrode of a diode 52 and the anode of the diode 52 may be connected to one input terminal of a two input terminal NAND gate 54. The one input terminal of the NAND gate 54 may also be connected through a resistor 56 to the positive voltage source +V.

The output signal from the inverter 46 may be applied to one input terminal of a two input terminal NAND gate 58 and the output signal from the NAND gate 54 may be applied through an inverter 60 to one input terminal of a two input terminal NAND gate 62. The output signals from the NAND gates 58 and 62 may be applied to the respective input terminals of a two input terminal NAND gate 64 and the output signal from the NAND gate 64 may be applied through an inverter 66 to the reset input terminal R of a suitable conventional JK flip-flop 68.

The vertical blanking signal VB (waveform H) may be applied to the other input terminal of the NAND gate 54 and to one input terminal of a two input terminal NAND gate 70. The output signal from the NAND gate 70 may be applied through a capacitor 72 to the input terminal of an inverter 74 and the input terminal of the inverter 74 may be connected through a resistor 76 to the positive voltage source +V. The output signal from the inverter 74 may be applied to the other input terminal of each of the NAND gates 58 and 70 and through an inverter 78 to the other input terminal of the NAND gate 62. The output signal from the inverter 78 may also be applied through an inverter 80 to the clock input terminal C of the flip-flop 68. The J or set steering input terminal of the flip-flop 68 may be connected to the positive voltage source +V and the K or reset steering input terminal may be grounded. The output signal from the true or Q output terminal of the flip-flop 68 may be provided at the output terminal 34 for application to the cathode voltage control circuit 14 of FIG. 1.

In operation, the NAND gate 70, the capacitor 72, the inverter 74 and the resistor 76 comprise a monostable or one-short multivibrator 77. The period of this multivibrator is determined by the RC time constant of the capacitor 72 and the resistor 76 and is chosen such that the gating signal of waveform I is generated in response to a vertical blanking pulse. The complement of this gating signal (waveform J) is thus available at the output terminal of the inverter 78. These complementary gating signals substantially correspond in duration and coincide in time to the first and second half cycles of the active portion of a normal sweep voltage.

Figure 5:
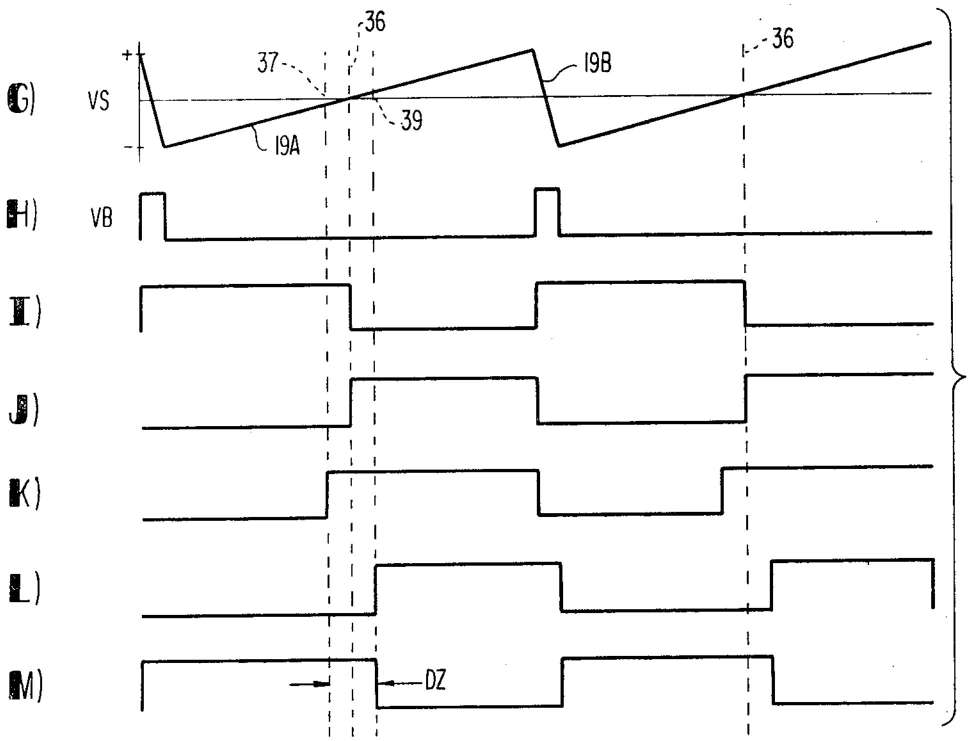

The resistor 42, diode 44, resistor 48 and inverter 46 function together as a crossover detector and detect a first predetermined point 37 in the sweep voltage adjacent the point at which the vertical sweep signal crosses through zero potential (the zero crossover point 36 of FIG. 5). Likewise, the resistor 50, diode 52, resistor 56 and NAND gate 54 function to detect a second predetermined point 39 in the sweep voltage adjacent the zero crossover point 36 of the vertical sweep signal. Any suitable conventional offset zero crossover detectors may be utilized to perform this function.

In the illustrated circuit, the resistors 48 and 56 may be identical in value and the resistors 42 and 50 may be selected to determine the exact point in the vertical sweep signal at which the respective inverter 46 and NAND gate 54 assume high signal levels. For example, the resistor 42 may be selected such that the inverter 46 assumes a high signal level just prior to the zero crossover point 36 on the vertical sweep voltage as is illustrated in waveform K of FIG. 5. This point 36 may correspond to a −0.7 volt sweep voltage level. Likewise, the resistor 50 may be selected so that the output signal of the NAND gate 54 assumes a high signal level immediately subsequent to the zero crossover point 36 of the active portion 19A of the vertical sweep voltage as is illustrated in waveform L. This point 39 may correspond to a +0.7 volt sweep voltage level. By inverting the output signal from the NAND gate 54 (waveform L), a signal having a high signal level during the entire first half cycle of the sweep voltage and a small portion of the second half cycle of the sweep voltage (waveform M) may be provided.

The crossover indicating signals from the inverters 46 and 60 change in duration in opposite directions if the zero crossover point of the sweep voltage changes. The gating signals from the inverter 74 and the inverter 78 gate the respective zero crossover indicating signals from the inverters 46 and 60 to the NAND gate 64. Whenever either of the zero crossover indicating signals is less than one-half cycle in duration indicating an abnormal sweep voltage condition, the output signal from the NAND gate 64 momentarily assumes a low signal level resetting the flip-flop 68. When the flip-flop 68 is reset, the output signal at the true output terminal Q thereof assumes a low signal level and provides a sweep voltage failure indication at the output terminal 34. During the next cycle of the sweep voltage, if the sweep voltage has returned to normal, the flip-flop 68 will again be set by the clock signal from the inverter 80 to remove the failure indicating signal from the output terminal 34.

Since the crossover indicating signals of waveforms K and M overlap slightly, a "dead zone" (DZ) through which slight sweep signal variations do not reset the flip-flop 68 is provided. This dead zone may be set to any desired value for a particular sweep voltage through selection of the resistors 42 and 50.

It can be seen from the foregoing description that the monitoring and protection system of the present invention is particularly advantageous. The reaction time of the circuit is extremely fast and the circuit not only permits the detection of sweep loss but also permits the detection of other abnormal sweep voltage conditions.

The present invention may be utilized in almost any system wherein the detection of abnormal sweep voltage conditions is necessary. Moreover, the sensitivity of the circuit of the present invention may be varied through adjustment of the "dead zone", further increasing the versatility of the circuit. The digital nature of the circuit provides further advantages with respect to cost and size.

The present invention may thus be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A circuit for detecting an abnormal condition of a sweep voltage which substantially linearly varies over one active cycle from one potential to another potential through a zero potential crossover point, said circuit comprising:

first means for generating complementary gating signals each substantially corresponding in duration and coinciding in time to a respective half cycle of a normal active cycle of said sweep voltage; and, second means responsive to said gating signals and said sweep voltage for monitoring the position of said sweep voltage zero crossover point and for generating a sweep voltage monitoring signal having one signal level for a desired position of said crossover point and another signal level for other positions of said crossover point.

2. The circuit of claim 1 wherein said first means comprises a monostable multivibrator having a time constant approximately equal to one-half cycle of a normal active cycle of said sweep voltage, said monostable multivibrator being triggered from its stable to its unstable state by a blanking signal synchronized with said sweep voltage.

3. The circuit of claim 1 wherein said second means comprises:

means for generating first and second pulses oppositely variable in duration in relation to the condition of the sweep voltage, said first and second variable duration pulses being of substantially the same duration for a normal sweep voltage condition and differing in duration from an abnormal sweep voltage condition; and, means for gating said first and second variable duration signals in response to said first and second gating signals, respectively, to generate said monitoring signal.

4. The circuit of claim 3 wherein said first means comprises a monostable multivibrator having a time constant approximately equal to one-half cycle of a normal active cycle of said sweep voltage, said monostable multivibrator being triggered from its stable to its unstable state by a blanking signal synchronized with said sweep voltage.

5. The circuit of claim 1 wherein said second means comprises:

means for inverting said sweep voltage; and, means for gating said sweep voltage and said inverted sweep voltage respectively to said first and second gating signals, respectively, to generate said monitoring signal.

6. The circuit of claim 5 wherein said first means comprises a monostable multivibrator having a time constant approximately equal to one-half cycle of a normal active cycle of said sweep voltage, said monostable multivibrator being triggered from its stable to its unstable state by a blanking signal synchronized with said sweep voltage.

7. A circuit for monitoring a sweep voltage which substantially linearly varies over one active cycle from one potential to another potential through a zero potential crossover point, said circuit comprising:

means for generating first and second pulses oppositely variable in duration in response to a change in the position of the zero crossover point of said sweep voltage;

means for generating first and second gating signals each substantially corresponding in duration and coinciding in time to a respective half cycle of an active normal cycle of said sweep voltage; and, means for gating first and second variable duration pulses in response to said first and second gating pulses, respectively, to provide a sweep voltage monitoring signal.

8. The circuit of claim 7 wherein said means for generating said first and second pulses comprises first and second zero bilevel crossover detectors eah biased to change levels on opposite sides of said zero crossover point such that said first and second pulses overlap in time.

9. The circuit of claim 8 wherein said gating signal generating means comprises a monostable multivibrator having a time constant approximately equal to one-half cycle of a normal active cycle of said sweep voltage, said monostable multivibrator being triggered from its stable to its unstable state by a blanking signal synchronized with said sweep voltage.

10. A circuit for protecting a scanned electron tube against damage due to an abnormal condition of a sweep voltage which cyclically repeats at a predetermined rate comprising:

means for generating first and second complementary gating signals in response to a first blanking signal;

means for inverting the sweep voltage;

means for gating the sweep voltage and the inverted sweep voltage responsively to said first and second gating signals, respectively, to generate a digital signal having a first signal level for a normal condition of the sweep voltage and having a second signal level for an abnormal condition of the sweep voltage; and means for periodically sampling the level of said generated digital signal at a rate exceeding the repetition rate of the sweep voltage and for generating a unique signal responsively to the sampling of said second signal level.

11. The circuit of claim 10 wherein said sampling and unique signal generating means comprises a selectively steered bistable multivibrator clocked in response to a second blanking signal having a repetition frequency greater than said first blanking signal.

12. The circuit of claim 11 wherein said digital signal generating means comprises:

means for generating first and second complementary gating signals in response to said first blanking signal;

means for inverting the sweep voltage; and, means for gating the sweep voltage and the inverted sweep voltage responsively to said first and second gating signals, respectively, to generate said digital signal.

13. A method for detecting an abnormal condition of a sweep voltage which substantially linearly varies over one active cycle from one potential to another potential through a zero potential crossover point, said method comprising the steps of:

generating first and second complementary gating signals each substantially corresponding in duration and coinciding in time to a respective half cycle of a normal active cycle of the sweep voltage; and, monitoring the position of the sweep voltage zero crossover point and generating a sweep voltage monitoring signal having one signal level for a desired position of said crossover point and another signal level for other positions of said crossover point in response to the generated gating signals and the sweep voltage.

14. The circuit of claim 13 wherein the gating signals are generated by triggering a monostable multivibrator having a time constant approximately equal to one-half cycle of a normal active cycle of the sweep voltage from its stable to its unstable state with a blanking signal synchronized with the sweep voltage.

15. The method of claim 13 wherein the position of the sweep voltage zero crossover point is monitored by:

generating first and second pulses oppositely variable in duration in relation to the condition of the sweep voltage, the first and second variable duration pulses being of substantially the same duration for a normal sweep voltage condition and differing in duration for an abnormal sweep voltage condition; and, gating the first and second variable duration signals in response to the first and second gating signals, respectively, to generate said monitoring signal.

16. The method of claim 15 wherein the gating signals are generated by triggering a monostable multivibrator having a time constant approximately equal to one-half cycle of a normal active cycle of the sweep voltage from its stable to its unstable state with a blanking signal synchronized with the sweep voltage.

17. The method of claim 13 wherein the position of the sweep voltage zero crossover point is monitored by:

inverting the sweep voltage; and, gating the sweep voltage and the inverted sweep voltage responsively to the first and second gating signals, respectively, to generate the monitoring signal.

18. The method of claim 17 wherein the gating signals are generated by triggering a monostable multivibrator having a time constant approximately equal to one-half cycle of a normal active cycle of the sweep voltage from its stable to its unstable state with a blanking signal synchronized with the sweep voltage.

* * * * *